UNITED STATES PATENT OFFICE.

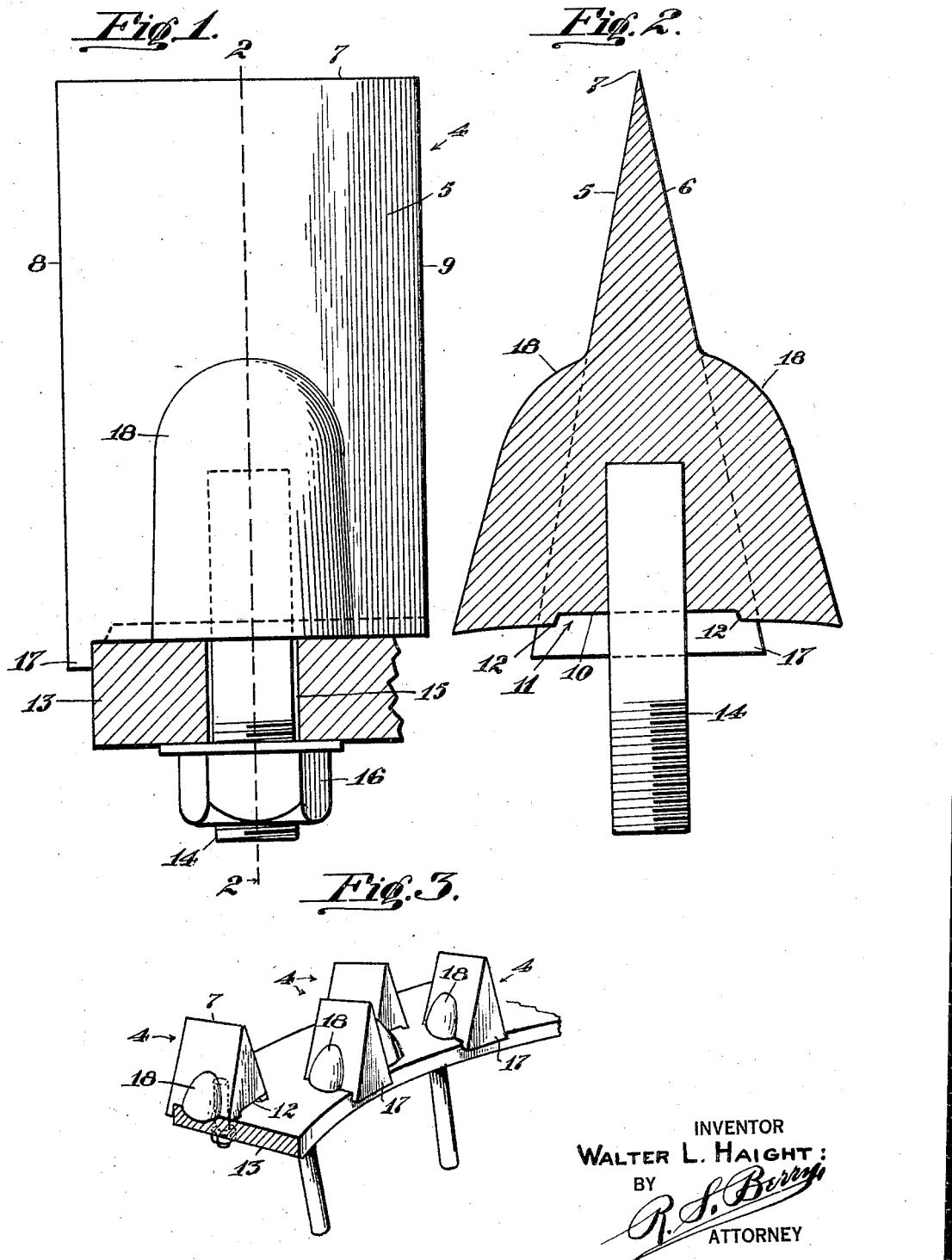

WALTER L. HAIGHT, OF LOS ANGELES, CALIFORNIA.

SELF-CLEANING SPUD.

1,403,026.

Specification of Letters Patent.  Patented Jan. 10, 1922.

Application filed January 7, 1920. Serial No. 349,955.

*To all whom it may concern:*

Be it known that I, WALTER L. HAIGHT, a citizen of the United States, residing at Los Angeles, in the county of Los Angeles and State of California, have invented new and useful Improvements in Self-Cleaning Spuds, of which the following is a specification.

This invention relates to a spud or grouser for the drive wheels of power propelled vehicles for the purpose of increasing traction.

It is the object of this invention to provide a spud or grouser which may be detachably mounted on a wheel rim so as to permit removal thereof when it is desired to drive the vehicle over surfaces where the spuds would injure the surface, and which will permit of the ready attachment of the spuds to the wheel rim when their use is desired as in propelling the vehicle over soft ground.

A further object is to provide a spud or grouser which is self-cleaning, that is, so formed that soil will be prevented from accumulating between adjacent spuds and interfering with the operation thereof.

Other objects will appear hereinafter.

The invention is illustrated in the accompanying drawings, in which:

Figure 1 is a view in side elevation of the spud, illustrating the manner of mounting same.

Figure 2 is a detail in vertical section as seen on the line 2—2 of Figure 1.

Figure 3 is a detail in perspective, illustrating the manner of applying the spuds to a wheel rim.

In carrying out the invention, the spud is preferably formed with a body portion 4, the side walls 5 and 6 of which are preferably rectangular in outline and taper from the base portion of the spud into intersection with each other at the outer end portion thereof to form a narrow or sharp edge 7 to permit ready penetration of the soil. The end walls 8 and 9 of the spud are preferably flat and extend parallel with each other, and the bottom wall 10 is recessed as indicated at 11 to form downwardly projecting marginal ribs 12 along the sides of the spud adapted to seat on the outer periphery of the wheel rim 13; the recessed portion 11 permitting the spud to seat on arcuate surfaces of wheels of various diameters.

As a means for detachably connecting the spud to the wheel rim, a threaded stud 14 is embedded in the spud and projects from the bottom wall 10 thereof; the stud being anchored in the spud in any suitable manner as by mutilating the surfaces of the stud and casting it in the metal of which the spud is formed. The stud 14 is adapted to extend through an opening 15 formed in the wheel rim 13 and to receive a nut 16 on its outer end, by means of which the spud may be clamped on the wheel rim as particularly shown in Figure 1. As a means of preventing the spud from turning and for holding it transversely of the wheel rim, a downwardly projecting flange 17 is formed on one end of the spud and adapted to project over the edge of the rim 13 so as to engage the latter and cooperate with the stud 14 in holding the spud against displacement.

An important feature of the present invention resides in a means for rendering the spud self-cleaning and which consists in forming a protuberance 18 on the inclined side faces of the spud and which is preferably formed of arcuate cross section and extending from the base of the spud to a point about midway between the base and apex thereof, with the outer end portion of the protuberance rounded and tapering into intersection with the side wall of the spud, as particularly shown in Figure 2.

These protuberances 18 serve to exert a wedge like action on accumulations of soil tending to adhere to the spud as the latter leaves the ground on rotation of the wheel, in such manner that the soil will ordinarily fall from the spud rather than collect thereon, and such soil as may adhere to the spud and be carried on the upper face of the spud as the latter advances upward on rotation of the wheel will ordinarily fall from the spud on the downward movement thereof, so that the spud will be clean on again entering the ground.

The spuds may be mounted on the wheel rim in any desired arrangement but are preferably staggered thereon, as shown in Figure 3, with adjacent spuds engaging the opposite edges of the wheel rim; the spuds being of a length less than the width of an ordinary wheel rim. This permits of a one sized spud being employed on wheels of different tread widths.

By providing a demountable spud, the number of spuds with which a particular wheel may be fitted may be varied as occasion may require, as in some instances it is desirable that the spuds be disposed in close proximity to each other throughout the wheel periphery and in other cases to be spaced a considerable distance apart.

This invention is particularly adapted for use on farm tractors and is particularly advantageous in that the spuds may be removed when it is desired to drive the tractor over roadways where it is necessary that the tractor drive wheels have comparatively smooth tread surfaces in order to avoid injury to the road surfaces.

I claim:

1. A spud for wheel rims comprising a body member having inclined side walls, a tapered protuberance on each of said side walls having its reduced portion terminating about midway of the length of said side walls and its enlarged portion adapted to seat on the wheel rim.

2. A spud for wheel rims comprising a body member having inclined walls intersecting above the wheel rim to provide an acute angled edge, and a tapered protuberance on each of said side walls having its reduced portion terminating about midway of the length of said side walls and having its lower end abutting the wheel rim.

In testimony whereof I hereunto affix my signature this 17th day of December, 1919.

WALTER L. HAIGHT.